(12) United States Patent
Bessarabov et al.

(10) Patent No.: US 9,397,357 B2
(45) Date of Patent: Jul. 19, 2016

(54) MEMBRANE ELECTRODE ASSEMBLY COMPRISING A CATALYST MIGRATION BARRIER LAYER

(75) Inventors: Dmitri Bessarabov, Potchefstroom (ZA); Sumit Kundu, Burnaby (CA); Stephen Lee, New Westminster (CA); Scott McDermid, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 858 days.

(21) Appl. No.: 13/087,476

(22) Filed: Apr. 15, 2011

(65) Prior Publication Data

US 2011/0256466 A1    Oct. 20, 2011

Related U.S. Application Data

(60) Provisional application No. 61/324,471, filed on Apr. 15, 2010.

(51) Int. Cl.
*H01M 8/1004* (2016.01)
*H01M 8/10* (2016.01)
*H01M 4/86* (2006.01)

(52) U.S. Cl.
CPC .......... *H01M 8/1004* (2013.01); *H01M 4/8657* (2013.01); *H01M 2300/0082* (2013.01); *H01M 2300/0094* (2013.01); *Y02E 60/521* (2013.01)

(58) Field of Classification Search
CPC .................................................... H01M 8/1004
USPC .......................................................... 429/483
See application file for complete search history.

(56) References Cited

U.S. PATENT DOCUMENTS

| 7,052,792 B2* | 5/2006 | Gascoyne et al. ............. 429/535 |
| 8,227,117 B2* | 7/2012 | Hampden-Smith ...... B01J 21/18 429/400 |
| 8,735,013 B1* | 5/2014 | Liu et al. ........................ 429/433 |
| 2008/0286616 A1* | 11/2008 | Motupally et al. .............. 429/13 |
| 2010/0075203 A1* | 3/2010 | Braeuninger et al. .......... 429/40 |

FOREIGN PATENT DOCUMENTS

WO    WO2008133689    * 11/2008

* cited by examiner

*Primary Examiner* — Ula C Ruddock
*Assistant Examiner* — Thomas Parsons
(74) *Attorney, Agent, or Firm* — Patent Central LLC; Stephan A. Pendorf

(57) ABSTRACT

A membrane electrode assembly for a fuel cell is disclosed, which comprises at least one porous ionomer containing layer disposed at the interface between the cathode electrocatalyst material and the ion exchange membrane of the fuel cell. The porous ionomer containing layer comprises a catalyst migration impeding compound. The membrane electrode assembly exhibits improved stability against Pt dissolution and Pt-band formation within the ion exchange membrane, hence having improved durability and lifetime performance.

8 Claims, 5 Drawing Sheets

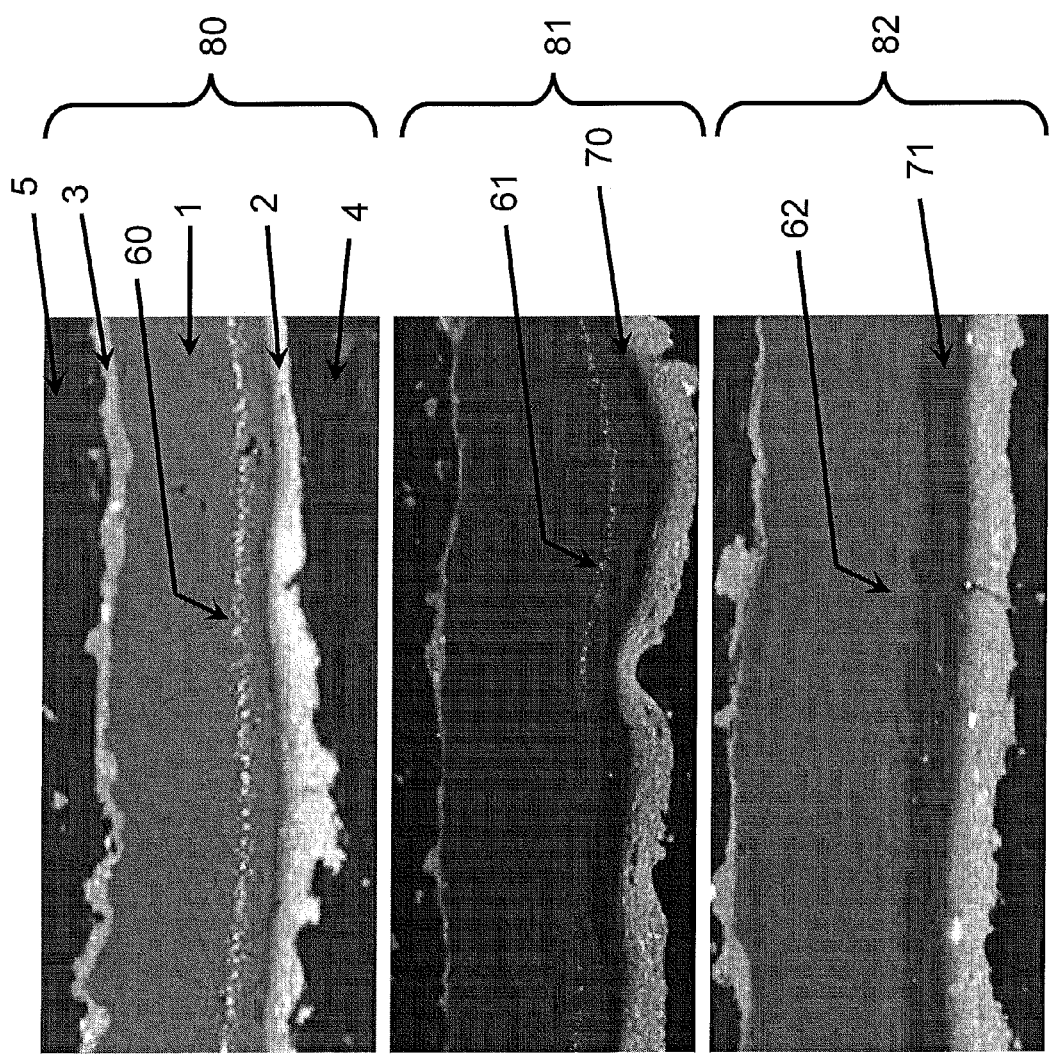

MEMBRANE ELECTRODE ASSEMBLY COMPRISING A CATALYST MIGRATION BARRIER LAYER

FIELD OF THE INVENTION

The present invention relates to electrochemical fuel cells. In particular, the invention provides an improved membrane electrode assembly for a fuel cell and a fuel cell containing the improved membrane electrode assembly. The improved membrane electrode assembly comprises a porous ionomer containing layer being disposed between the membrane and the cathode and comprising a catalyst migration impeding compound.

BACKGROUND OF THE INVENTION

An advanced hydrogen-based fuel cell power-train system for the automotive industry must meet a number of demanding requirements to become commercially attractive. These include improvements in fuel economy, power efficiency and durability in order to provide a vehicle range equaling that of an internal combustion engine—all of which have to be achieved while trying to meet cost targets. Automotive data indicate that dissolution of the fuel cell catalyst material, in particular Pt dissolution, is a significant degradation mode that currently limits the lifetime of the membrane electrode assemblies (MEA) of a fuel cell. Although, in the following the invention is disclosed focusing on Pt, the invention is not limited to Pt as a catalyst material. Other catalyst material may also be employed, for example alloys containing Pt, e.g. PtCo, or not.

Polymer electrolyte membrane (PEM) fuel cells are electrochemical devices that take a flow of hydrogen and air and convert them, electrochemically, into electrical power and heat. PEM fuel cells can be used in a wide range of applications, including stationary power-generating units, back-up power systems and in transportation. There are currently a number of issues that need to be addressed before large-scale commercialization of hydrogen fuel cell technology can happen.

Key issues regarding the main technical challenges to automotive fuel cells are directly associated with MEA components. They include, for example:
  The cost of the membrane electrode assembly (MEA) needs to be reduced. The cost requirement is one of the primary drivers for the hydrogen fuel cell (HFC) automotive technology. A significant part of the costs is allotted to the expensive Pt-catalyst material. Usually, a higher amount of Pt is used as is actually needed to compensate for the catalyst degradation during operation of a fuel cell.
  The MEA durability needs to be improved considerably to address to address catalyst degradation. More specifically, more than 4000 hours of a driving cycle are required. There also should be minimal loss of power caused by the following degradation phenomena in the MEA: loss of power because of Pt-catalyst agglomeration and dissolution; carbon corrosion; and other degradation mechanisms.
  The mass activity of the oxygen reduction reaction (ORR) catalyst needs to be increased by at least a factor of four. The current assumption is that future HFC automotive systems will have less than 0.3 mg/cm² of the total catalyst loading, in particular Pt loading, in their MEAs.
  The gas permeability of the PEM (to hydrogen, nitrogen and oxygen) needs to be reduced.

Though a fuel cell stack has no moving parts—which is a benefit for overall durability and reliability—a fuel cell consists of a number of materials that perform a variety of functions. Durability requirements for automotive fuel cells are particularly aggressive because of the wide range of temperatures, relative humidity (RH) and pH conditions that the cell must operate under for extended periods. Typical MEA stressors include:
  Start-up and shut-down transients;
  load/voltage cycles;
  temperature cycles (less than 0° C. to in excess of 95° C.);
  RH cycling; and
  cell reversal.

One fuel cell material of particular interest is the cathode catalyst layer, which is responsible for facilitating the oxygen reduction reaction (ORR), and is also required to transport oxygen and water, conduct heat, protons and electrons. Any deficiency or degradation of one of these functions impacts the entire cell and system.

Much of the variability in automotive conditions stems from local driving conditions, such as different seasons and weather. In addition to such external factors, driver behavior has a significant impact on how the cell operates and thus what stressors may be applied to the fuel cell. A typical automotive duty cycle consists of many load transients, holds, periods of idling and start-up/shut-down sequences that are related to driver behavior. Load/potential cycling in a fuel cell vehicle (FCV) contributes to various operating conditions that may accelerate degradation of MEAs. It is well known that potential cycling is detrimental to the cathode Pt-catalyst especially when higher potentials (>1.0 V) are reached. Moreover, it is well-known that load cycling/potential cycling along with start/stop cycles primarily result in catalyst and catalyst support degradation through the dissolution and redeposition of the Pt. Understanding the relationship between operating conditions and degradation mechanisms enables more robust fuel cells to be developed.

Analysis of MEAs subjected to testing based on a user load profile has shown signs of Pt dissolution. As such, a great deal of research effort is going into gaining an understanding of the Pt dissolution mechanism. The basic mechanisms of Pt dissolution during a voltage cycle have been studied by many research groups. For example, it has been shown that Pt can dissolve at potentials greater than 1 V. At these high potentials, Pt dissolves electrochemically:

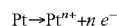

$$Pt \rightarrow Pt^{n+} + n\ e^-$$

$$n=2, 4, 6$$

The cathode potential in an automotive fuel cell typically ranges between approximately 0.6 V to 0.95 V during normal operation. However, excursions up to 1.5 V are possible during start-up and shut-down events. Even though high voltages encourage the formation of a Pt oxide layer which has been shown to slow the Pt dissolution rate, a voltage cycle that repeatedly forms and removes this layer, such as in a vehicle cycle, may have a very high dissolution rate.

Because of the costs and effort involved in preparing large stacks, and the long lifetimes that are necessary for fuel cell products, it is not feasible to perform research and development activities on this scale. Thus, to facilitate material screening and general research activities it is necessary to use small-scale fuel cells and accelerated stress tests (ASTs). Such protocols are also useful for targeting and understanding specific degradation mechanisms. An AST that is commonly used for measuring the stability fuel cell catalysts is voltage cycling. This stress test magnifies the dissolution and agglomeration process while attempting to mimic the voltage cycling that is seen in vehicles. Many voltage cycling ASTs cycle cell voltage between 0.6 V and 1.2 V while flowing humidified hydrogen on the anode and humidified air on the cathode, however there are many variations. Protocols in the literature vary by the voltage window, the voltage profile (square wave, triangle wave or sinusoidal) and input gasses, which results in different degradation rates. One of the protocols that simulates actual vehicle conditions draws a load using a load-bank to bring cell voltage to 0.6 V and then switches to a power supply to boost voltages to 1.2 V with air and hydrogen on the cathode and anode, respectively, in a square wave pattern.

Observations from using a voltage cycling AST include decreased performance; a decreasing electrochemical platinum surface area (EPSA); migration of Pt into the ionomer membrane, forming a Pt-band; and a Pt-depleted zone in the cathode catalyst layer. Application of the voltage cycling AST results in a significant performance loss. This is largely attributed to a decrease in the cathode EPSA that initially degrades quickly over the first 1000 cycles and then begins to plateau with increasing cycles. Depending on the type of catalyst used, this plateau may be non-zero. The reason why a non-zero plateau exists is still under investigation, however, it is likely because of a combination of the stabilisation of the Pt-particles as well as transport limitations brought about by an increasing distance between Pt-particles in the catalyst layer and the ionomer membrane.

A common observation from a voltage cycling AST is the migration of Pt into the electrolyte membrane. FIG. 1 compares transmission electron microscopy (TEM) images of a catalyst-coated membrane (CCM) at beginning of life (BOL) with the same type of membrane after voltage cycling. At the beginning of life (FIG. 1a) the electrolyte membrane is free of any visible contaminants. However, after voltage cycling (FIG. 1b) Pt can be seen in the membrane where it has formed a distinct (Pt) band approximately 3.8-4.2 µm from the cathode catalyst layer edge. Another observation is the presence of a Pt-depleted region in the catalyst layer at the catalyst-membrane interface. This can be seen in FIG. 1c, and indicates that the Pt-band originated from the cathode catalyst layer. Within the membrane the Pt may precipitate out in a variety of sizes. Analysis of Pt-particle morphology in the Pt-band may provide additional information on the mechanism of formation of the Pt-band. For example, evidence of the existence of the single and isolated Pt-particles in the membrane suggests that the growth of Pt started with the reduction of Pt-cations in the ionomer matrix. However, details of further dynamics of the growth of the Pt-particles into larger clusters are not yet clear. For more detail see S. Kundu, M. Cimenti, S. Lee, and D. Bessarabov, "Fingerprint of Automotive Fuel Cell Cathode Catalyst Degradation: Pt band in PEMs", Membrane Technology 10 (2009) 7-10.

Thus, a MEA with improved stability against Pt dissolution and Pt-band formation needs to be developed for the industry to overcome the degradation problem.

SUMMARY OF THE INVENTION

Provided is a membrane electrode assembly for a fuel cell, which comprises:
(a) a porous anode gas diffusion layer (GDL);
(b) a porous cathode gas diffusion layer (GDL);
(c) an ion exchange membrane (polymer electrolyte membrane, PEM) interposed between said porous anode gas diffusion layer and said porous cathode gas diffusion layer;
(d) an anode electrocatalyst material disposed at the interface between said porous anode gas diffusion layer and said ion exchange membrane;
(e) a cathode electrocatalyst material disposed on the surface of said porous cathode catalyst layer;
(f) at least one porous ionomer containing layer disposed at the interface between said cathode electrocatalyst material and said ion exchange membrane;
wherein said porous ionomer containing layer comprises a catalyst migration impeding compound.

The catalyst material used may be any suitable catalyst material which is able to catalyze the desired electrochemical reaction at the cathode of a fuel cell during its operation. However, use of Pt or a Pt-alloy such as PtCo is preferred. In the following, to simplify matters, the invention is illustrated by referring to Pt as the catalyst material used.

Adjacent to the anode and cathode GDLs, respectively, further layers, such as gas distribution layers, may be arranged.

The ionomer used in the porous ionomer containing layer may be any suitable ionomer, various of them being known to a person skilled in the art. The ionomer may be the same ionomer as used for the ion exchange membrane material, for example a perfluorosulfonic acid (PFSA) such as Nafion. However, it may also be a specific ionomer different to that of the ion exchange membrane. If, for example, a PFSA was used for the ion exchange membrane, then a hydrocarbon ionomer may be used, such as, for example, sulfonated Poly (etheretherketone) (sPEEK). If the same ionomers are used as the ion exchange membrane material and the ionomer of the porous ionomer containing layer, then, they may differ in molecular weight.

Without being bound by a particular theory, it is believed that the porous ionomer containing layer acts as a barrier for the migration of $Pt^{n+}$-ions, hence impeding the migration into the ion exchange membrane and, moreover, impeding the dissolution an agglomeration of the Pt-catalyst material. Thereby, the durability of a fuel cell containing the inventive membrane electrode assembly is improved significantly and, moreover, performance losses are attenuated.

In one embodiment the catalyst migration impeding compound of the membrane electrode assembly comprises an electrically conductive metal oxide, a metal phosphate, a metal ion sequestering compound, a functionalized carbon, an antioxidant, or a catalytically active compound, or combinations thereof.

Referring to said electrically conductive metal oxide, suitable examples are $SnO_2$ doped with Sb and titanium oxides and suboxides, in particular $TiO_2$, doped with Nb, or combinations thereof.

Referring to the functionalized carbon, the carbon may be functionalized with one or more metal ion sequestering moieties. Moreover, the metal ion sequestering moieties may be linked with specific anchor groups to the carbon. One preferred example of a suitable anchor is an imidazole group.

An antioxidant is a compound which is able to inhibit an oxidative attack of an aggressive chemical species to, for example, the ion exchange material. Under the operation conditions of a fuel cell, peroxide radicals may be such aggressive chemical species. Consequently, radical scavengers are examples of suitable antioxidants. One suitable example of an inorganic antioxidant additive is $MnO_2$. Moreover, one suitable example of an organic antioxidant additive is triphenylphosphine. Furthermore, organic/inorganic hybrid additives are also suitable, as well as combinations of the aforesaid examples.

Referring to the catalytically active compounds, hydrogen oxidation reaction (HOR) catalysts are suitable examples. Further suitable examples are metal-phthalocyanine complexes. Combinations of the aforesaid examples are also suitable.

Al the aforesaid migration impeding compounds may have specific geometries. E.g. they may be employed in the form of fibers, which has the advantage that the mechanical strength of the porous ionomer containing layer may be improved. Alternatively, the migration impeding compounds may be employed in the form of flakes, which has the advantage that tortuosity of the porous ionomer containing layer may be increased.

The porous ionomer containing layer may also contain additives that help to improve the interface between the catalyst layer and the ion exchange membrane layer. Those interface improving additives may improve adhesion between the adjacent layers. In addition, they may improve proton conductivity between ion exchange membrane and catalyst layer.

In another embodiment the electrically conductive metal oxides is a carbon-metal oxide composite material.

In still another embodiment the electrically conductive metal oxides comprises $NbO_2$.

In still another embodiment the porous ionomer containing layer is formed by one of a porous carbon layer or a porous composite-material matrix. The porous carbon layer may be formed similar to a gas diffusion layer (GDL).

In still another embodiment the porous composite-material matrix comprises one of a cold formed plastic (CFP) or expanded Polytetrafluoroethylene (PTFE).

A fuel cell comprising the membrane electrode assembly is also provided.

BRIEF DESCRIPTION OF THE FIGURES OF THE DRAWINGS

FIG. 2 illustrates SEM images of cross-sections of MEAs after EOL a) of conventional MEA 80; b) of inventive MEA 81 having a 2 μm porous ionomer containing layer; c) of an inventive MEA 82 having a 5 μm porous ionomer containing layer.

DETAILED DESCRIPTION OF THE PREFERRED EMBODIMENTS

Figure 1A:
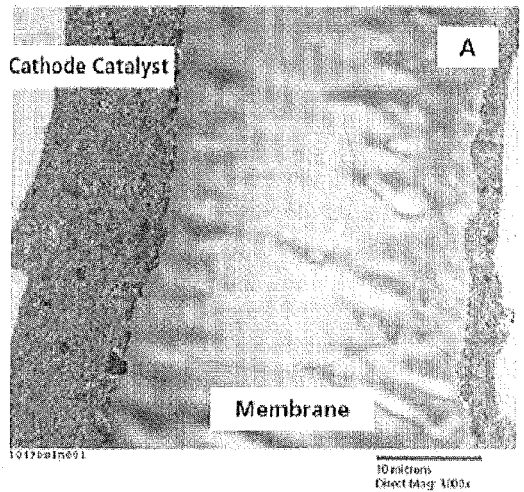
FIG. 1 illustrates TEM images of a CCM at a) BOL; b) after voltage cycling; c) after voltage cycling, magnified, illustrating Pt-band and Pt-depleted region.
Figure 1B:
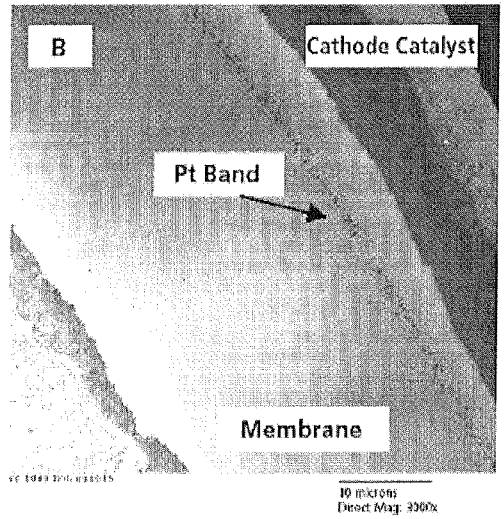
Figure 1C:
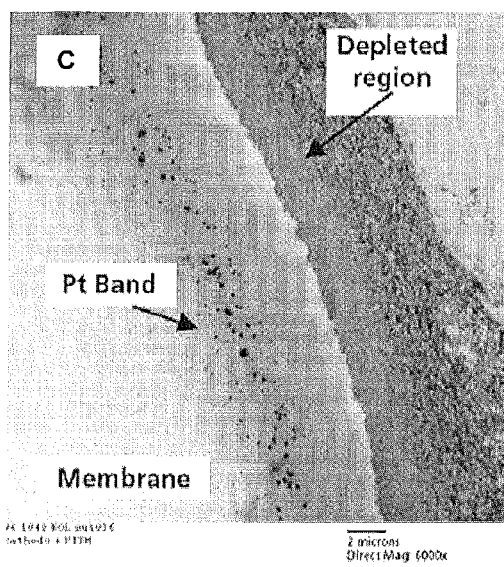

In the figures, similar components have the same components have similar reference numbers.

A fuel cell stack that generates electricity generally includes several to many unit cells stacked in multi-layers. Each unit cell is formed with a membrane electrode assembly (MEA) and includes a separator, sometimes referred to as a bipolar plate. The membrane electrode assembly has an anode, sometimes referred to as a fuel electrode or an oxidation electrode, and a cathode, sometimes referred to as an air electrode or a reduction electrode, connected by means of an electrolyte membrane between them.

A fuel is supplied to the anode and reacted on catalysts, often coated as layers on the membrane, hence forming a catalyst coated membrane (CCM). The fuel is oxidized to produce protons and electrons. The electrons are transferred to the cathode via an out-circuit, and the protons are transferred to the cathode through the ion exchange membrane, preferably a polymer electrolyte membrane. An oxidant is supplied to the cathode, and the oxidant, protons and electrons are reacted on a catalyst present on or in the cathode to product electricity and water. The anode and also the cathode comprise often a gas diffusion layer (GDL).

It has been found that the presence of a porous ionomer containing layer comprising a catalyst migration impeding compound and being arranged between the cathode catalyst layer and the ion exchange membrane, according to the present invention, attenuates or impedes the formation of a Pt-band within the membrane. This can be seen from FIG. 2. FIG. 2a illustrates a cross-section of a conventional membrane electrode assembly 80 after the end of its life (EOL). The ion exchange membrane 1 is arranged between the porous cathode GDL 4 and the porous anode GDL 5. At the interface between the anode GDL 5 and the membrane 1 an anode catalyst material 3 is disposed in the form of a layer, and at the interface between the cathode GDL 4 and the membrane 1 a cathode catalyst material 2 is disposed in the form of a layer. Clearly assembly 81 after EOL. However, this membrane electrode assembly 81 contains a porous ionomer containing layer 70 disposed at the interface between the cathode electrocatalyst layer 2 and the ion exchange membrane 1. The porous ionomer containing layer 70 comprises a catalyst migration impeding compound (not shown) and its thickness is 2 μm. Again, a Pt-band 61 has formed. However, it can clearly be seen that Pt-band 61 is less strongly developed compared to Pt-band 60 of the conventional membrane electrode assembly 80. It is believed that porous ionomer containing layer 70 acts as a Pt migration barrier, hence attenuating the formation of a Pt-band 61 within the membrane 1. FIG. 2c illustrates another example of an inventive membrane electrode assembly 82. Similarly to membrane electrode assembly 81 the membrane electrode assembly 82 of this example has a porous ionomer containing layer 71 which as, however, a thickness of 5 μm. It can be clearly seen from FIG. 2a that Pt-band 62 is even less strongly developed compared to Pt-band 61 of membrane electrode assembly 81 as illustrated in FIG. 2b.

US 2005/0053817 A1 discloses a membrane electrode assembly for a fuel cell which comprises an ion exchange membrane arranged between a anode catalyst layer and a cathode catalyst layer which, in turn, is arranged between an anode gas diffusion layer and a cathode gas diffusion layer. A substantially catalyst-free, porous condensation layer is arranged between at least one catalyst layer and the membrane. However, porous condensation layer serves to absorb water formed during the fuel cell reaction at the catalyst and to distribute it evenly to the surface of the membrane in order improve its humidity, but it does not contain a catalyst migration impeding compound.

US 2008/0286616 A1 discloses another membrane electrode assembly with a specific layer interposed between the ion exchange membrane and the cathode catalyst layer. The additional layer serves to prevent migration of, for example, metal and metal ions from reaching the membrane. However, the additional layer is not porous, consists of a metal, in particular a catalyst metal, and does not contain a catalyst migration impeding compound.

Figure 3:
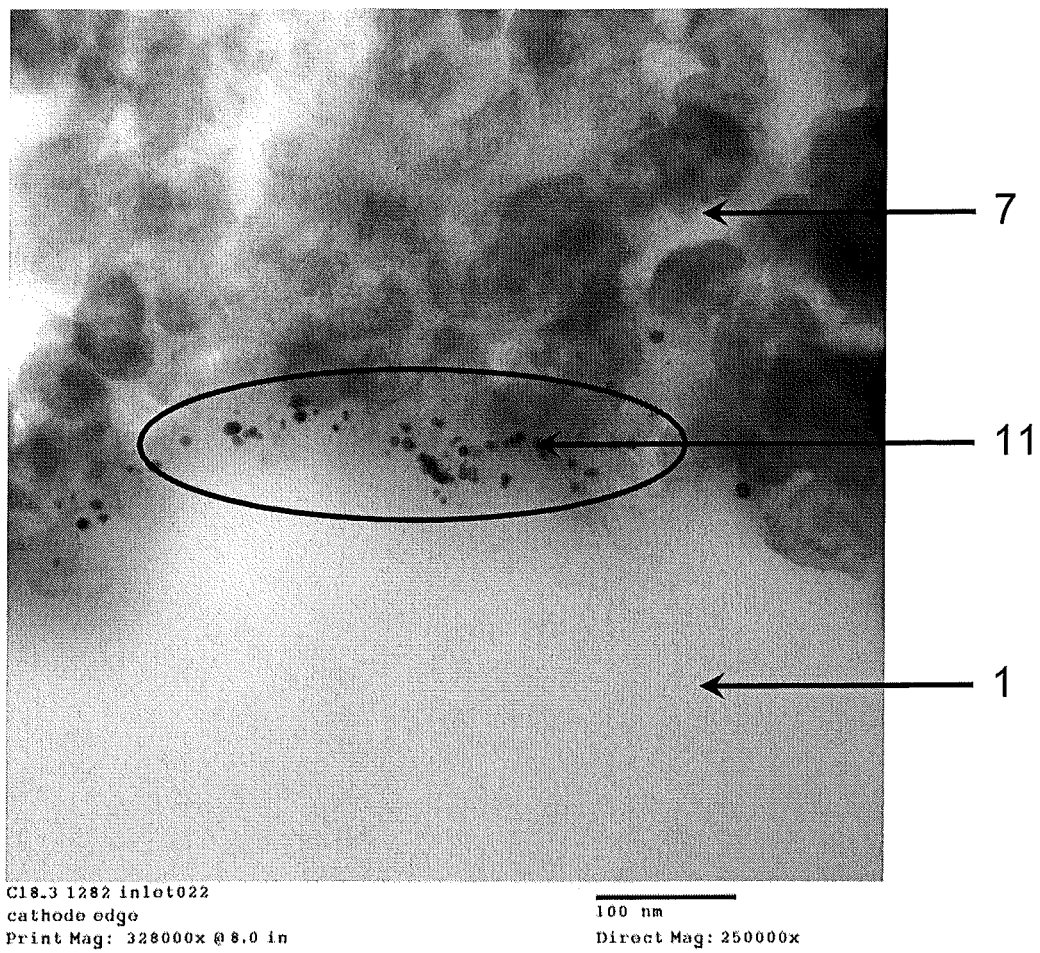
FIG. 3 illustrates a detail of the TEM image of the cross-section of inventive MEA 81.

FIG. 3 shows some evidence that porous ionomer containing layer comprising a catalyst migration impeding compound of an inventive membrane electrode assembly acts as a Pt migration barrier. The shown TEM image of membrane electrode assembly 81 reveals Pt-particles 11 precipitated at the interface between ion exchange membrane 1 and porous ionomer containing layer comprising a catalyst migration impeding compound 70. This indicates that porous ionomer containing layer comprising a catalyst migration impeding compound 70 impeded the diffusion of $Pt^{n+}$ ions into ion exchange membrane 1.

Figure 4:
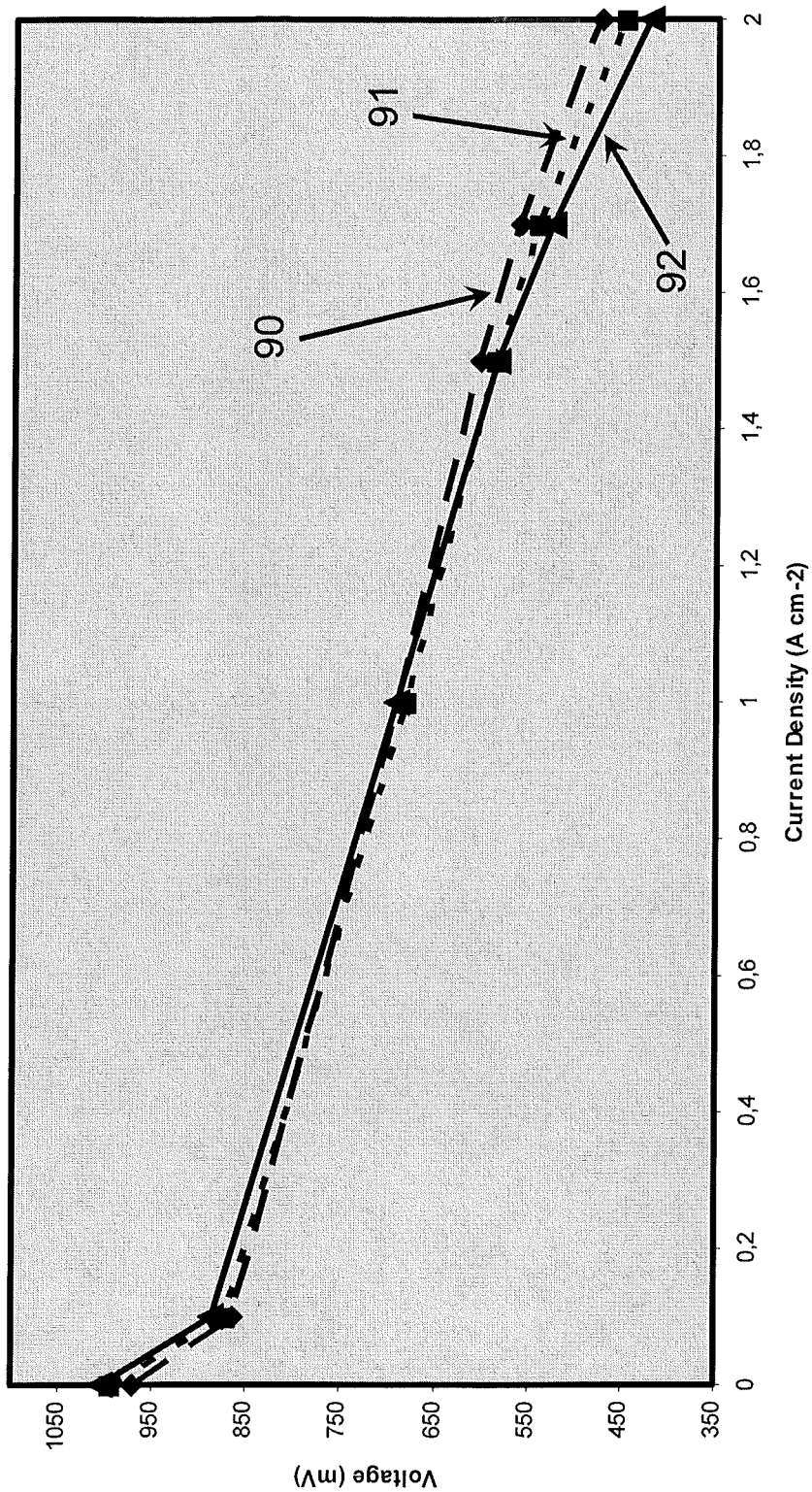
FIG. 4 illustrates Polarization curves of MEAs 80, 81, and 82.

Polarization curves 90, 91, and 92 of the three membrane electrode assemblies 80, 81, and 82 have been compiled and are illustrated in FIG. 4. In particular, polarization curve 90 is related to membrane electrode assembly 80, polarization curve 91 is related to membrane electrode assembly 81, and polarization curve 92 is related to membrane electrode assembly 82. The three curves demonstrate that the three membrane electrode assemblies exhibit almost identical performance. Thus, the porous ionomer containing layer comprising a catalyst migration impeding compound 70, 71 of the inventive membrane electrode assemblies 81 and 82 have no adverse impact on the performance of membrane electrode assemblies 81, 82. Moreover, in the low current density region between approximately 0 and 1 A/cm², inventive membrane electrode assemblies 81, 82 even exhibit an improved performance compared to conventional membrane electrode assembly 80.

Figure 5:
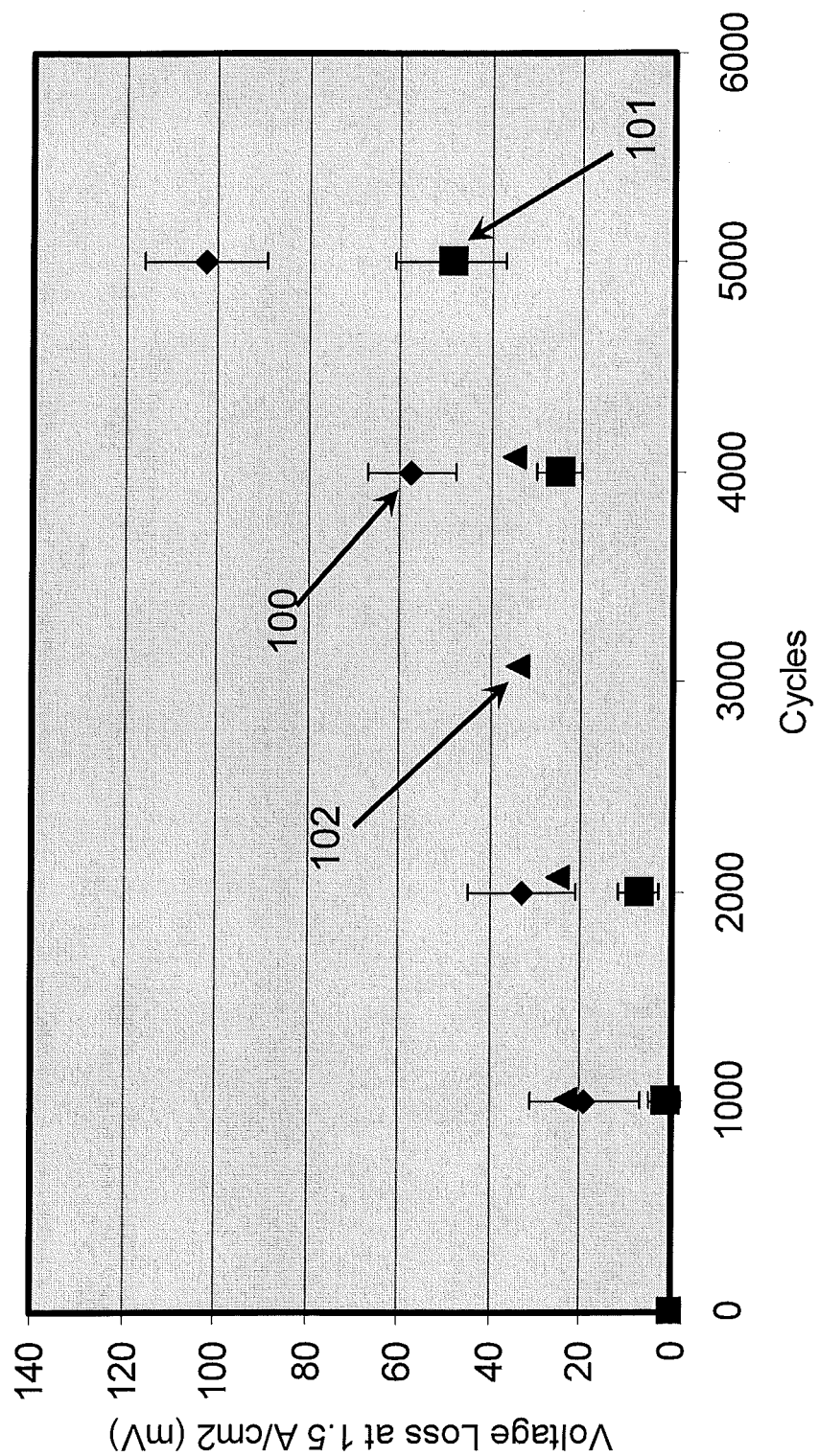
FIG. 5 illustrates the voltage cycling during ASTs of MEAs 80, 81, and 82.

Membrane electrode assemblies 80, 81, and 82 have also been subjected to an accelerated stress test (AST) by voltage cycling. FIG. 5 illustrates the result of the AST. Measures values 100 are related to membrane electrode assembly 80, measured values 101 are related to membrane electrode assembly 81, and measured values 102 are related to membrane electrode assembly 82. The measured values demonstrate that there is an interrelationship between voltage loss and thickness of the porous ionomer containing layer comprising a catalyst migration impeding compound 70, 71: The thicker layer 70, 71, the lesser the voltage loss.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

EXAMPLES

Example 1

Preparation of Membrane Electrode Assembly 80

MEA 80 was prepared according to well known standard procedures. A Nafion PFSA NRE-211 membrane from DuPont was used as proton exchange membrane. It was coated with 0.25 mg/cm² Pt catalyst loading on the cathode and 0.05 mg/cm² Pt catalyst loading on the anode, respectively. Microporous layers on hydrophobic Toray carbon paper were used as porous anode gas diffusion layer and porous cathode gas diffusion layer.

Example 2

Preparation of Membrane Electrode Assemblies 81, 82

MEAs 81 and 82 were prepared by similar procedure as described for MEA 80. However, an additional coating step was introduced to form a layer between the ion exchange membrane 1 and the cathode electrocatalyst layer 2. The coating step was performed according to a standard procedure which is, for example, usually applied during routine MEA coating steps. Said standard procedure is well known to those skilled in the art.

Example 3

Assembly of Test Stacks

Three Ten-cell stacks were assembled using either MEA 80, or MEA 81, or MEA 82. The electrochemical active area of each unit fuel cell was 48.4 cm². A subscale hardware was used in each case, i.e. carbon bipolar plate having straight parallel fuel and oxidant channels, respectively.

Example 3

Automotive Duty Cycle Test Procedure

The three ten-cell stacks were subjected to approximately 575 h of a simulated automotive duty cycle consisting of load transients and holds, start-ups/shut-downs, and various temperature holds. The duty cycle consequently results in potential cycles caused by the start-ups/shut-downs as well as load cycling. One cycle is approximately of 3.5 h. Air/$H_2$ polarization curves were measured before and after 575 h worth of cycling. Both polarizations and the duty cycle were performed on an automated fuel cell test station. Post-duty, the MEAs were analyzed by transmission electron microscopy (TEM) at McMaster University.

Example 4

Polarization Curves

Air/$H_2$ polarization curves were measured before and after voltage cycling. Air was passed through the cathode and hydrogen was passed through the anode at 12 and 6 slpm/cell (standard liters per minute per fuel cell) flow rates respectively. Both gases were fully humidified (100% RH). Air was pressured to 1.5 bars and hydrogen was pressurized to 2.0 bars with a cell temperature of 60° C. A load bank was used to draw current.

Example 5

Voltage Cycling Test Procedure

Cathode voltage cycling experiments were performed in a 5-cell stack configuration on MEAs 80, 81, and 82. Air was passed through the cathode and hydrogen was passed through the anode at 12 and 6 slpm/cell flow rates respectively. Both gases were fully humidified (100% RH). Air was pressured to 1.5 bars and hydrogen was pressurized to 2.0 bars with a cell temperature of 60° C. MEAs were cycled in a square wave fashion with dwell times of 30 s at 0.6 V and 30 s at 1.2 V. Voltage was brought to 0.6 V using a load bank and then boosted to 1.2 V using a power supply connected in parallel. MEAs were subjected to approximately 5000 cycles.

What is claimed is:

1. A membrane electrode assembly for a fuel cell, said membrane electrode assembly comprising
 (a) a porous anode gas diffusion layer;
 (b) a porous cathode gas diffusion layer;
 (c) an ion exchange membrane interposed between said porous anode gas diffusion layer and said porous cathode gas diffusion layer;

(d) an anode electrocatalyst material disposed at the interface between said porous anode gas diffusion layer and said ion exchange membrane;

(e) a cathode electrocatalyst material disposed on the surface of said porous cathode catalyst layer;

(f) at least one porous ionomer containing layer disposed at the interface between said cathode electrocatalyst material and said ion exchange membrane;

wherein said porous ionomer containing layer comprises a catalyst migration impeding compound different from the anode and cathode electrocatalyst material, wherein said catalyst migration impeding compound is a functionalized carbon, and wherein said functionalized carbon comprises carbon being functionalized with one or more metal ion sequestering moieties.

2. The membrane electrode assembly of claim 1, wherein the porous ionomer containing layer is formed by one of a porous carbon layer or a porous composite-material matrix.

3. The membrane electrode assembly of claim 2, wherein the porous composite-material matrix comprises one of a cold formed plastic (CFP) or expanded Polytetrafluoroethylene (PTFE).

4. A fuel cell comprising the membrane electrode assembly of claim 1, wherein the cathode electrocatalyst material is elemental platinum (Pt).

5. A fuel cell comprising the membrane electrode assembly of claim 1, wherein the anode and cathode electrocatalyst material is elemental platinum (Pt).

6. A fuel cell comprising the membrane electrode assembly of claim 1, wherein the anode electrocatalyst material is elemental platinum (Pt).

7. The membrane electrode assembly of claim 1, wherein the one or more metal ion sequestering moieties are linked to the carbon with an imidazole group as anchor group.

8. A membrane electrode assembly for a fuel cell, said membrane electrode assembly comprising
(a) a porous anode gas diffusion layer;
(b) a porous cathode gas diffusion layer;
(c) an ion exchange membrane interposed between said porous anode gas diffusion layer and said porous cathode gas diffusion layer;
(d) an anode electrocatalyst material disposed at the interface between said porous anode gas diffusion layer and said ion exchange membrane;
(e) a cathode electrocatalyst material disposed on the surface of said porous cathode catalyst layer;
(f) at least one porous ionomer containing layer disposed at the interface between said cathode electrocatalyst material and said ion exchange membrane;
wherein said porous ionomer containing layer comprises a catalyst migration impeding amount of a catalyst migration impeding compound different from the anode and cathode electrocatalyst material, wherein said catalyst migration impeding compound is a functionalized carbon, and wherein said functionalized carbon comprises carbon being functionalized with one or more metal ion sequestering moieties.

\* \* \* \* \*